M. O. REHFUSS.
CHAIN MAKING MACHINE.
APPLICATION FILED AUG. 23, 1919.
1,405,379.
Patented Jan. 31, 1922.
5 SHEETS—SHEET 3.
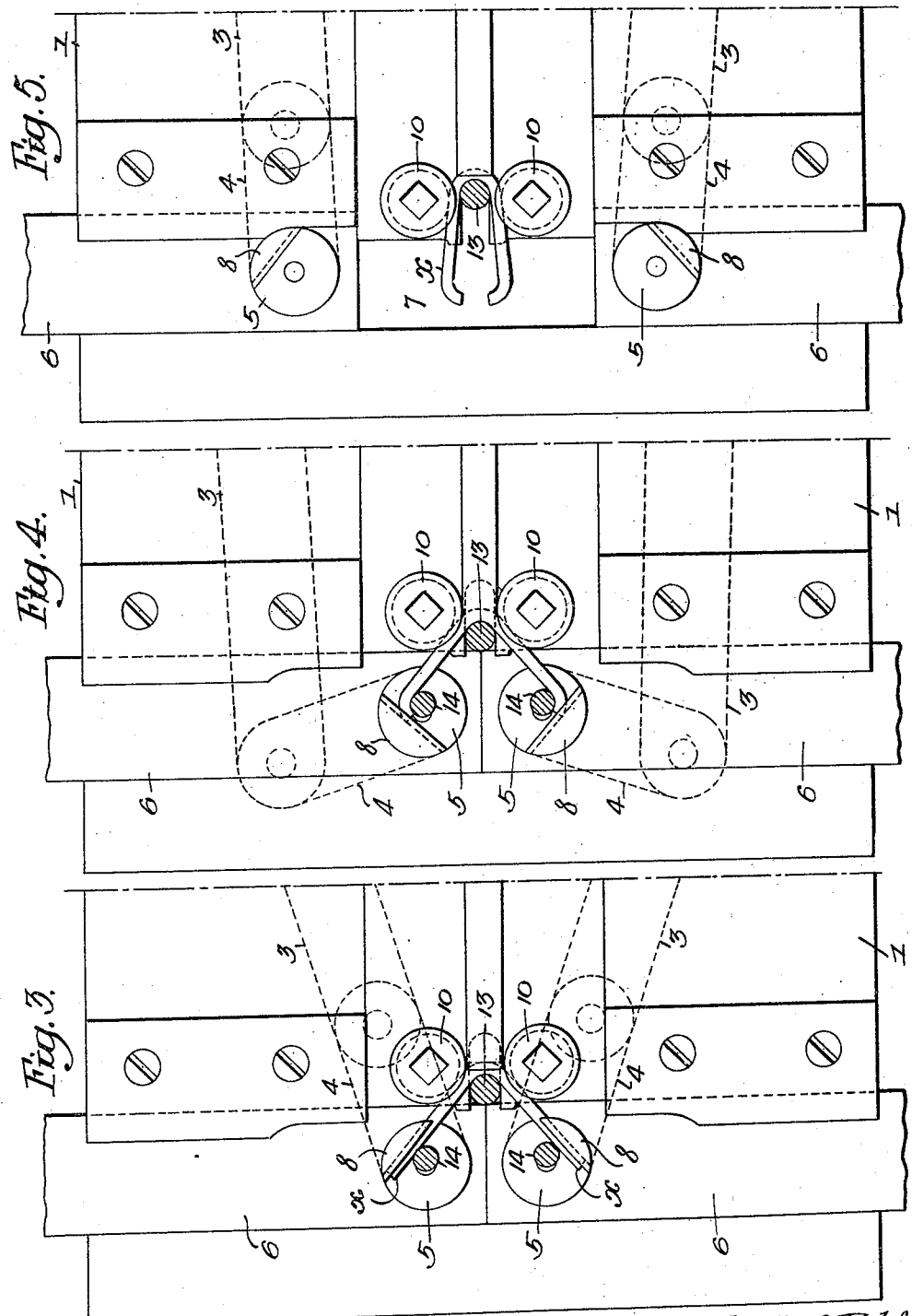

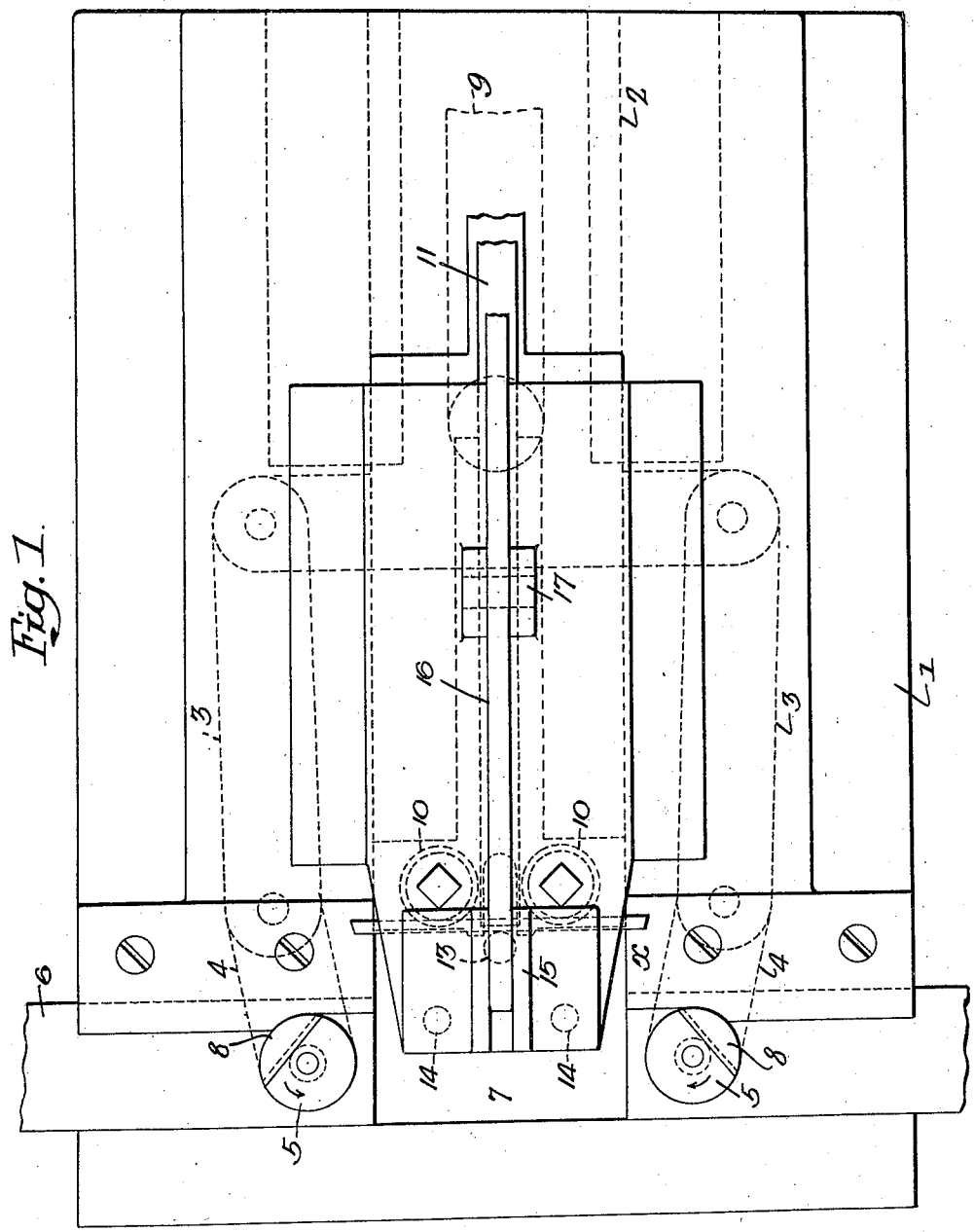

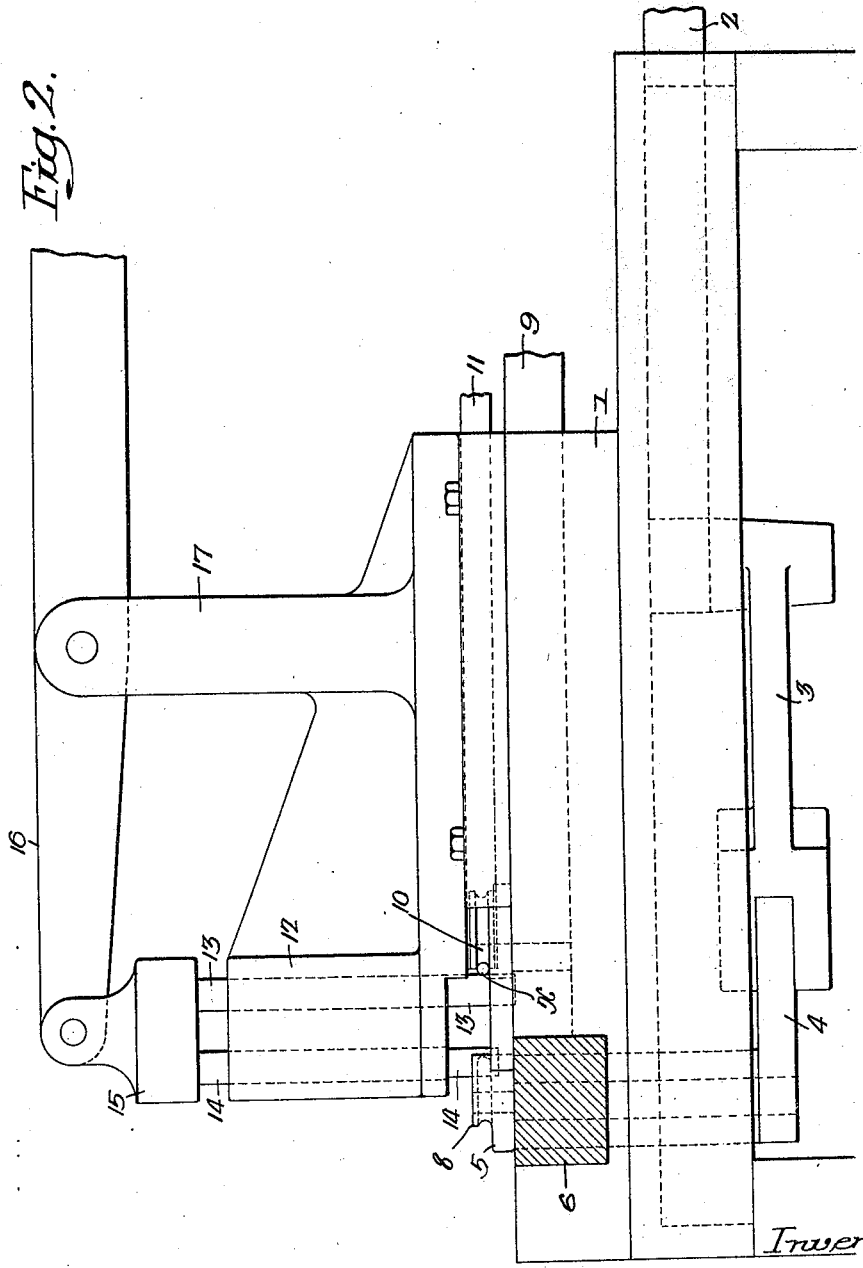

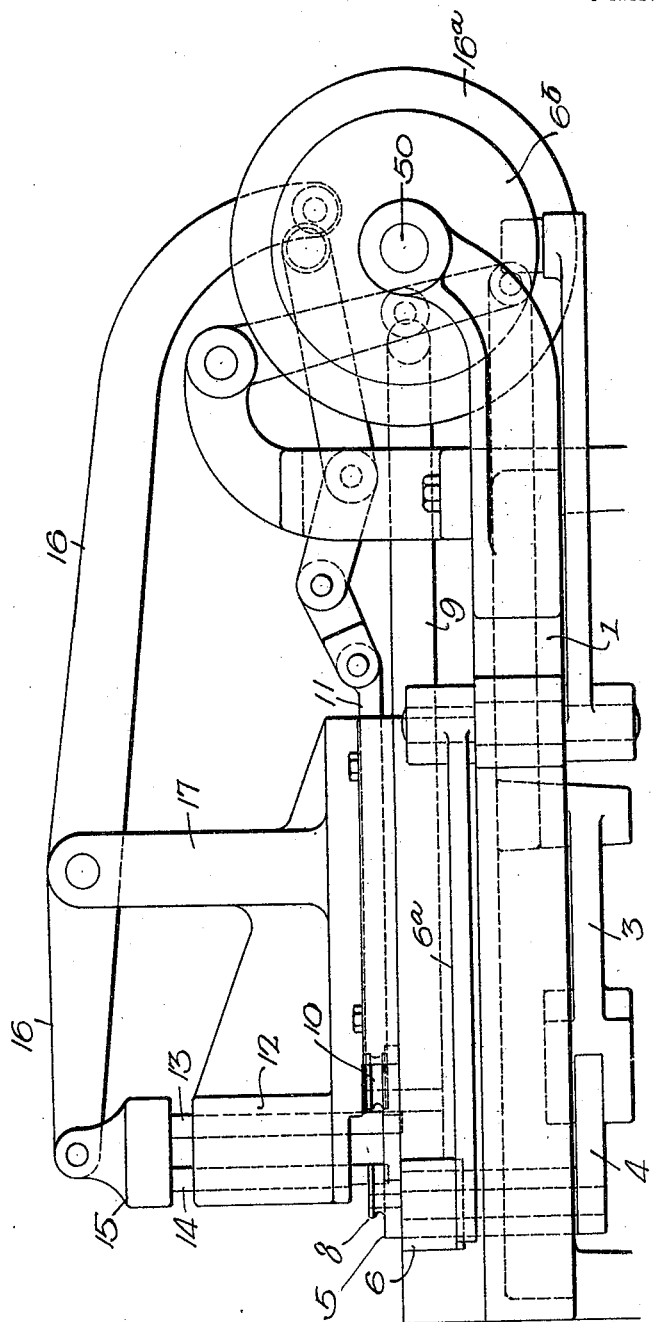

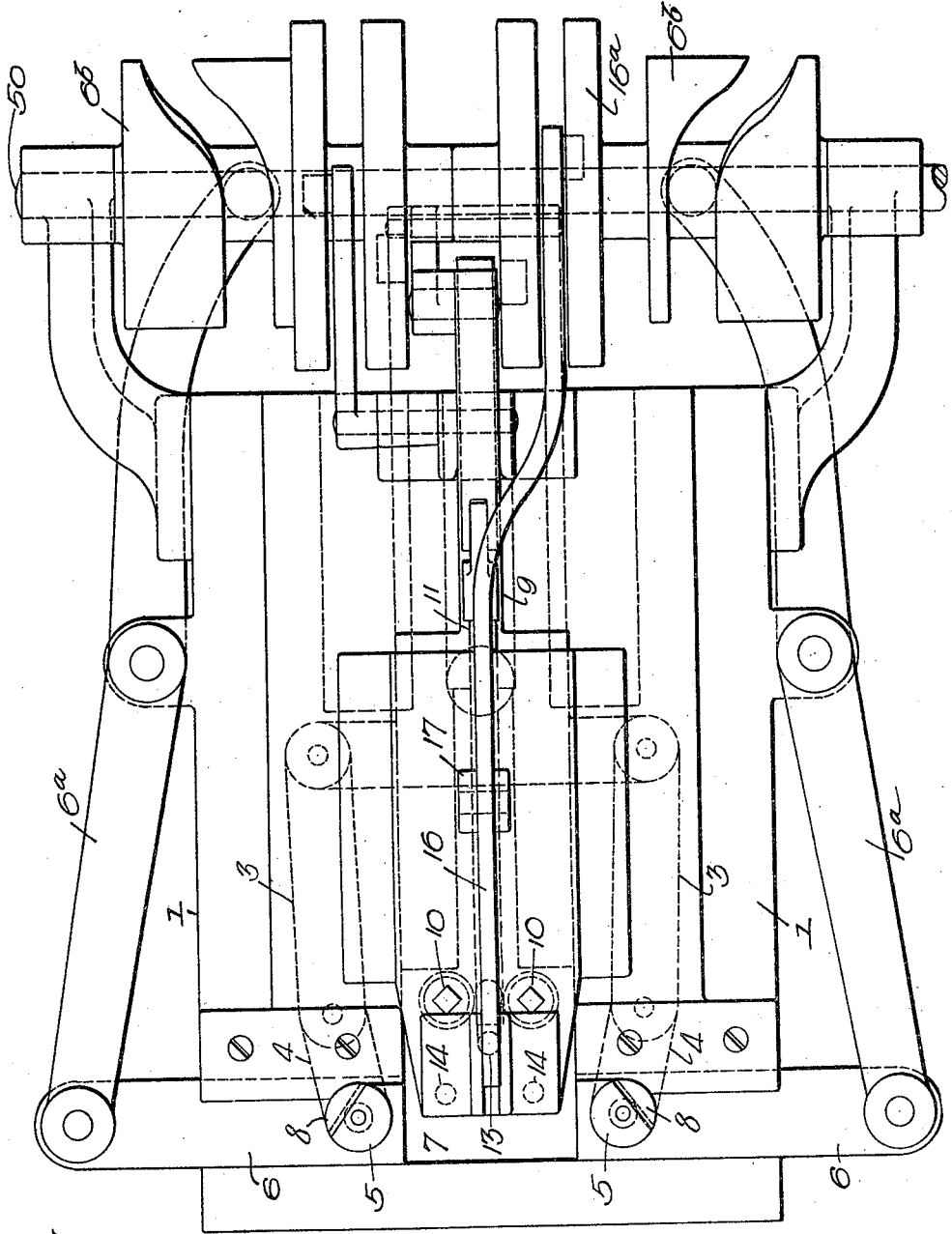

UNITED STATES PATENT OFFICE.

MARTIN O. REHFUSS, OF PHILADELPHIA, PENNSYLVANIA, ASSIGNOR TO UNITED STATES CHAIN AND FORGING COMPANY, OF PITTSBURGH, PENNSYLVANIA, A CORPORATION OF PENNSYLVANIA.

CHAIN-MAKING MACHINE.

1,405,379.  Specification of Letters Patent.  Patented Jan. 31, 1922.

Application filed August 23, 1919. Serial No. 319,315.

*To all whom it may concern:*

Be it known that I, MARTIN O. REHFUSS, a citizen of the United States, residing in Philadelphia, Pennsylvania, have invented a new and useful Chain-Making Machine, of which the following is a specification.

One object of my invention is to provide a novel succession of steps and also a new combination of members for forming chain links from straight wire or bar material;—the invention more particularly contemplating a method and mechanism for bending straight lengths of material into the form of elongated links each having an opening at one end whose width shall be sufficient to permit of its being threaded into a similar link whose ends have been welded.

It is further desired to provide a machine for forming links open at one end, which shall include means for shaping the links as hereafter described without mutilating the wire, the arrangement of parts being such as to accurately bend the ends of the wire operated on so that when the link is ultimately closed it shall be of perfect form.

These objects and other advantageous ends I attain as hereinafter set forth, reference being had to the accompanying drawings, in which;

Fig. 1 is a plan of the main portion of a chain making machine constructed in accordance with my invention;

Fig. 2 is a side elevation partly in section, further illustrating the machine shown in Fig. 1;

Figs. 3, 4 and 5 are plan views, partly in section, illustrating the operation of the machine, and Figs. 6 and 7 are respectively a side elevation and a plan of a complete machine embodying my invention.

In the above drawings 1 represents a base structure having a longitudinally extending guideway for a slide 2, one of whose ends is laterally extended in the form of two oppositely projecting arms each of which has pivoted to its outer extremity one end of a link 3. The other end of each of these links is pivotally connected to an arm 4 projecting at right angles from the lower end of a rotatable post 5 journalled in a slide 6 so as to extend vertically or at right angles to the plane of the base.

These two slides 6 with said oscillating posts are movable toward and from each other in a guideway 7, and said posts are maintained at all times equidistant from the center line or central longitudinal plane of the machine. The slide 2 is reciprocated in its guideway toward and from the slides 6 so that the posts 5 are oscillated on their vertical axes, and these slides 6 are movable toward and from each other also by suitable means, such as the levers 6$^a$ and the cams 6$^b$ on a main cam shaft 50.

The upper end of each post 5 is flat and is formed with an outwardly projecting segmental portion 8 whose chord or straight side is concaved to fit a wire or bar of circular cross section as shown in Fig. 2. The links 3 and arms 4 are mounted on the under side of the base structure 1 and the posts 5 project upwardly through the forward end of such structure so that their upper segment-carrying ends terminate a short distance above the flat top face thereof. The top of the base is formed with a guideway for a slide in the form of a bar 9 carrying at its forward end a pair of grooved rollers 10 spaced equal distances on opposite sides of the central vertical plane of the base and having their edges grooved or concave to fit the rod or wire stock operated on.

As shown in Fig. 2, said rollers 10 project upwardly from the forward end of the slide 9, above and parallel with which I provide a longitudinally movable clamping bar 11 operative in the central plane of the machine and extending between the two rollers 10;— its end being hollowed or recessed to permit it to receive the central portion of the blank $x$. Also carried on the base and projecting above the rolls 10 is a head 12 having three vertically extending guideways of which the center line of one lies in the central vertical plane of the machine and the center lines of the other two lie at equal distances on opposite sides of said plane.

A king post 13 is slidably mounted in the first of these guideways and is of such a length as to project into a correspondingly formed hole in the base structure 1. Two other king posts 14 are slidably mounted in the two remaining guideways of the standard 12 and their length is such that their lower ends may extend down onto and rest upon the upper face of the base structure.

All three of the king posts have their upper ends fixed to a vertically movable head 15 which is pivoted to one end of a lever arm 16 fulcrumed on a projection 17 extending upwardly from the base structure, and this lever is likewise connected to a suitable operating mechanism, such as a cam 16ª on the cam shaft 50, whereby it may be oscillated so as to reciprocate the king posts 13 and 14 to such an extent that in one position the latter extend below a horizontal plane through the grooves of the rollers 10 and segments 8, while in the second or upper position the king post 13 is drawn above such plane so that they are not engaged by the blank $x$.

Under operating conditions the blank is fed into the machine immediately to the rear of the king posts 13 and in front of the two rollers 10, and the lever 16 and head 15 are in such positions that the king posts 14 are in their lower positions;—the slides 6 being withdrawn in the position shown in Fig. 1 and the posts 5 so positioned that the straight sides of their segmental ends 8 define two lines intersecting each other at approximately a right angle. With the parts in the above noted positions, the clamping bar 11 is moved forwardly so as to clamp the straight blank $x$ against the king post 13. Immediately thereafter the slide 9 with its rollers 10 is moved forward so that the latter bend the blank into the form indicated in Fig. 3 so that its two parts extend at an angle to each other;—preferably less than 90°. The slides 6 then move toward each other so that the straight sides of their segments are parallel with and finally engage the end portions of the two sides of the blank, whereupon the slide 2 is moved forward, thereby causing a partial revolution of the posts 5 so that their segmental portions curve or bend the extremities of the blank toward each other around the lower ends of the king posts 14 into the positions shown in Fig. 4.

The lever 16 is then operated so as to raise the head 15 and with it the king posts so that the posts 14 are raised above the plane of the blank while the king post 13 still extends between the branches of the latter. The slide 9 is thereupon moved forwardly so that the rolls 10 occupy the positions shown in Fig. 5, thus further bending the sides of the blank around the king post 13 and pressing its bent ends into positions which while still separated, are immediately adjacent each other, the opening in the completed link being sufficient to permit it to be threaded through a similar link whose ends have been welded together. The finished link blank having the form shown in Fig. 5 is now removed, and the various parts of the machine are returned to the positions shown in Fig. 1 ready to operate on another blank;—the side slides 6 preferably being moved apart during the final bending operation.

I claim:

1. The combination in a chain link forming machine of a king post; two rollers positioned to cooperate with the king post to bend a straight blank into an angular blank; means for curving the ends of said blank toward each other, said rollers being thereafter operable to bend the sides of the blank into approximate parallelism.

2. The combination of a chain link forming machine of means for bending a straight blank into an angular form; two vertically reciprocable king posts; means for curving the ends of said angular blank toward each other around said king posts; and means for moving the king posts vertically away from the blank, said bending means being thereafter operable to bend the sides of the blank into approximate parallelism.

3. The combination in a chain link forming machine of three vertically movable king posts; a pair of horizontally movable rollers positioned to cooperate with one of said king posts to first bend a straight blank into an angular form and thereafter bend the sides of said blank into approximate parallelism; with means cooperating with the remaining king posts between the two operations of the bending rolls, to curve the ends of the blank toward each other.

4. The combination in a chain link forming machine of means for bending two parts of a straight blank by a succession of operations, into substantial parallelism; with means operative on the ends of the blank in the interval between said operations for curving said ends toward each other, the same consisting of two slides movable toward and from each other; rotatable bending posts carried by said slides respectively; and king posts positioned to cooperate with said posts.

5. The combination in a chain link forming machine of means for bending a straight blank to first give its main portions an angular form and thereafter bring said portions into substantial parallelism; a pair of king posts movable in lines at right angles to the plane of movement of said portions of the link; slides movable toward and from each other adjacent the ends of the blank; posts rotatably mounted on said slides and each having a segmental portion positioned to respectively cooperate with said king posts; and means for turning said rotatable posts to cause them to cooperate with the king posts to bend the ends of the blank toward each other.

6. The combination in a chain link forming machine of means for bending a straight blank to give its main portions an angular form and thereafter bring said portions into substantial parallelism; a pair of king posts movable in lines at right angles to the plane of movement of said portions of the link; slides movable toward and from each other adjacent the ends of the blank; posts rotatably mounted on said slides and each having a segmentally formed portion positioned to respectively cooperate with said king posts; and means for turning said rotatable posts to cause them to cooperate with the king posts to bend the ends of the blank toward each other, said means consisting of arms respectively connected to the rotatable posts; a slide movable toward and from the posts; and links respectively connecting said arms with said slide.

7. The method of making a chain link which consists in bending a straight blank into angular form; thereafter bending the ends of said blank toward each other; and finally acting upon the sides of the blank to bring them into approximate parallelism.

In witness whereof I affix my signature.

MARTIN O. REHFUSS.